No. 701,103. Patented May 27, 1902.
E. THACHER.
SLIDE RULE.
(Application filed Jan. 27, 1902.)

(No Model.)

Witnesses.
J. M. Fowler Jr
John I. Williams Jr

Inventor.
Edwin Thacher
by W. C. Carman
Atty

UNITED STATES PATENT OFFICE.

EDWIN THACHER, OF NEW YORK, N. Y., ASSIGNOR OF ONE-HALF TO EDSON M. SCOFIELD, OF PITTSBURG, PENNSYLVANIA.

SLIDE-RULE.

SPECIFICATION forming part of Letters Patent No. 701,103, dated May 27, 1902.

Application filed January 27, 1902. Serial No. 91,478. (No model.)

*To all whom it may concern:*

Be it known that I, EDWIN THACHER, a citizen of the United States, residing at New York, in the county of New York and State of New York, have invented certain new and useful Improvements in Slide-Rules; and I do hereby declare the following to be a full, clear, and exact description of the invention, such as will enable others skilled in the art to which it appertains to make and use the same.

My present improvement relates to that class of inventions exemplified by United States Letters Patent No. 677,817, issued to me on the 2d day of July, 1901, and comprises a calculating logarithmic slide-rule which has for its object a greater convenience in handling, a greater speed in calculations, and a greater range of useful calculations than can be obtained with slide-rules generally. The logarithmic scales may be stamped or engraved on the rule or they may be printed on paper, celluloid, or other material and attached to the side or sides of the rule, as is thought most desirable in manufacture. Obviously the slide admits of an easy movement back and forth to the right or left between the fixed lines of the rule, so that any number or division on the slide may be brought opposite to or in contact with any desired number or division on the fixed lines, admitting of accurate and rapid setting or reading without the aid of a runner.

Figure 1:
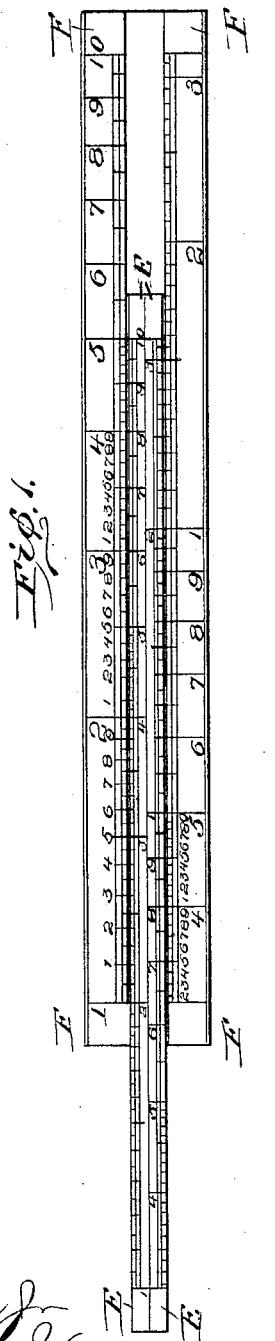
Figure 2:
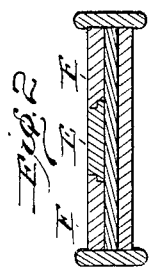

Figure 1 represents a slide-rule illustrative of my invention, showing the slide partly drawn out to the left. Fig. 2 shows a transverse section through rule and slide.

In Fig. 1, E and F represent logarithmic scales—that is, scales in which the distance of any number from the beginning of the scale corresponds to the mantissa of the logarithm of that number. Such scales are laid off in prime divisions from "1" to "10," each prime division being subdivided as finely as desired and depending upon the length of the rule. For a twenty-two-inch rule I would prefer to have each prime division subdivided as follows: from "1" to "2," one hundred parts; from "2" to "5," fifty parts; from "5" to "10," twenty parts. Some of these divisions are omitted from the drawings for the sake of clearness, the number and fineness of the subdivisions being optional with the manufacturer. These numbers or the values of the divisions represented thereby are purely arbitrary, thus "2" on the scales may mean two, twenty, two hundred, or .2, .02, .002, &c., as the nature of the problem to be solved may require. Such scales represent the logarithms of all numbers, the accuracy of the reading depending upon the length of scale employed and the number of its subdivisions. The manner of using such scales for making computations is well understood and need not here be described in detail.

In Fig. 1 scale F on the top fixed line is a complete and continuous scale, occupying the graduated length of the rule, beginning on the left and ending on the right. On the bottom fixed line this scale begins and ends at the center of the rule, the first half of the scale occupying the right half of the rule and the last half of the scale the left half of the rule, "1" or "10" on the top fixed line being opposite "$\sqrt{10}$" on the bottom fixed line. This gives a complete scale on each half of the fixed lines of the rule to the right or left of the center, on the left the first half being at the top and the last half at bottom and on the right the first half being at bottom and the last half at top. Scales E on the slide are of the same length and divided and arranged in the same manner as the adjacent scales F on the fixed lines, and when the ends of scales E and F are brought opposite to each other scale E on top edge of slide will match scale F on top fixed line and scale E on bottom edge of slide will match scale F on bottom fixed line, there being a complete scale E on each half of the slide to the right or left of the center. By moving the slide to the right or left any required number on scale E may be brought opposite to any required number on scale F without moving the end of the slide beyond the center line of the rule, and when so set complete logarithmic scales E and F will be found in contact for direct comparison. Consequently the scales being set for any given ratio, such ratio may be multiplied by any possible number within the reading limits of such scales and the results be read without a resetting of the rule. As scales E and F each have a length equal to the total graduated length of the rule and as the length of rule in all rules without a runner has heretofore been twice the length of scale, Fig. 1 gives without the aid of a runner a four-foot rule on a two-foot stick, resulting in much greater speed in operating than is possible with rules requiring a runner and much greater accuracy of results than can be obtained with rules requiring no runner.

Fig. 1 shows a rule adapted to the working of the general formula, $\frac{ex}{f}$ embracing all operations in multiplication, division, and proportion with greater accuracy than can be obtained customarily, the scales being of double length, and as such operations are required much more frequently than those in which powers and roots are involved, the equal rapidity of working combined with greater accuracy of results becomes important. In this formula $e$ and $f$ may have any value; but the slide must be set as often as their value is changed. $x$ is not used in setting and may have any number of values without resetting. This feature is of great value in all pro rata questions, stresses, sections, &c.—in fact, a very large percentage of all calculations. The formula is general. If, for example, in the formula $\frac{ex}{f}$, $f$ equals one, it becomes $ex$ or multiplication. If $e$ equals one, it becomes $\frac{x}{f}$ or division, and if $e$ and $f$ have a value different from one it is proportion. The formula $\frac{ex}{f}$ is worked by the following general rule: Opposite "$f$" on scale F set "$e$" on scale E. Then opposite "$x$" on F find answer on E. In the formula $\frac{ex}{f}$ $x$ is not used in setting and may have any number of values without resetting. Fig. 1 shows the slide drawn out to the left, so that "2" on E is opposite "1" on F, and a few examples in application will be given for the slide in this position.

$$\frac{ex}{f} = \frac{2 \times 6}{1} = 12.0,$$

$$\frac{1 \times 40}{5} = 8.0,$$

$$\frac{6 \times 13}{3} = 26.0, \&c.$$

By the term "logarithmic scale" as used in the claims is meant a scale extending from one to a value equal to the base of the particular system of logarithms employed and logarithmically divided, for example, in the case here shown and generally used from one to ten.

What I claim as my invention, and wish to secure by Letters Patent, is—

1. A slide-rule, bearing two sets of duplicate logarithmic scales, one set upon each side of its longitudinal center, one scale of each set being upon the slide and one upon the base, each scale having a length equal to the graduated length of the rule, both scales of one set reading continuously from left to right, and both scales of the other set reading from center to right and thence from left to center, substantially as described.

2. A slide-rule, composed of two fixed and two movable logarithmic scales, each composed of two equal parts arranged one above the other, having a combined length equal to the graduated length of the rule; one each of said fixed and movable scales being upon one side of the transverse center of the rule, and beginning on the top and ending on the bottom; and the other of said fixed and movable scales being upon the other side of the transverse center of the rule, and beginning on the bottom and ending on the top, all being direct scales, substantially as described.

3. A slide-rule bearing two sets of duplicate logarithmic scales, one scale of each set being upon the slide and one upon the base, so arranged that the square root of the base of the system of logarithms of each set is opposite the unit of one scale of the other set, substantially as described.

4. A slide-rule bearing two duplicate logarithmic scales relatively fixed, and so arranged that the square root of the base of the system of logarithms in one scale is approximately opposite the unit of the other scale, substantially as described.

In testimony whereof I subscribe my signature in presence of two witnesses.

EDWIN THACHER.

Witnesses:
WILLIAM MUESER,
SAML. W. PRATT.